Dec. 31, 1968 P. G. WILLIAMS, JR 3,418,730
PROBLEM-SOLVING EQUIPMENT
Filed Sept. 27, 1966 Sheet 2 of 3
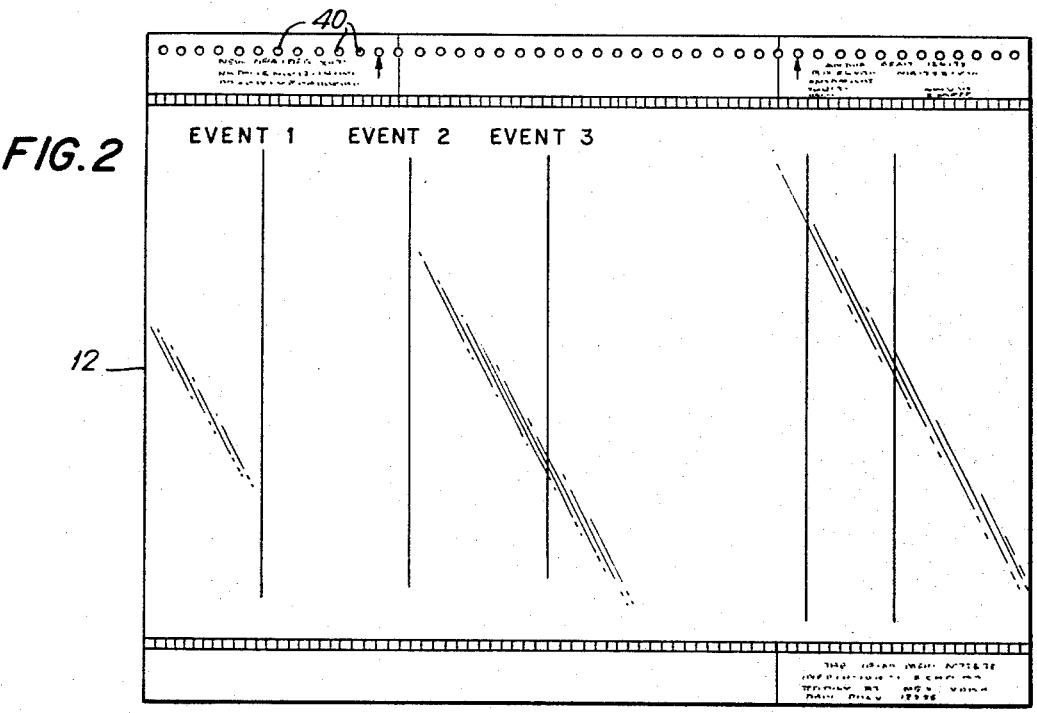
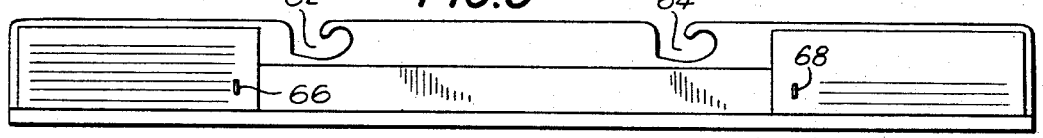
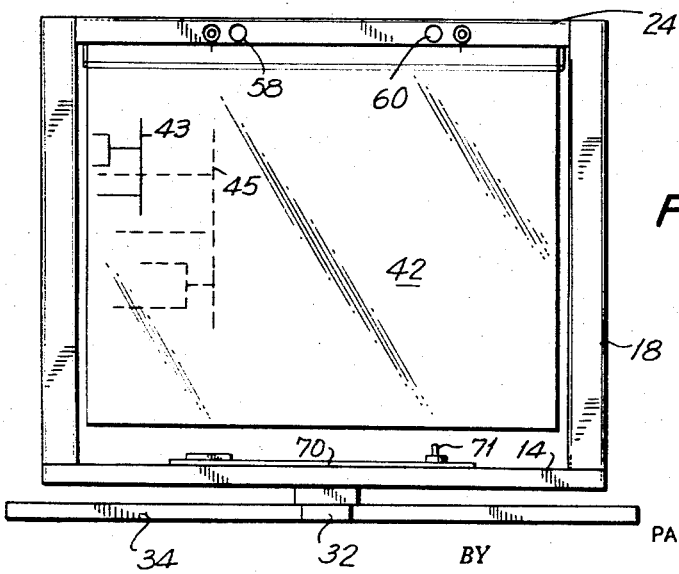
INVENTOR.
PAUL GILMORE WILLIAMS, Jr.
BY Curtis, Morris & Safford
ATTORNEYS Dec. 31, 1968 P. G. WILLIAMS, JR 3,418,730
PROBLEM-SOLVING EQUIPMENT
Filed Sept. 27, 1966 Sheet 3 of 3

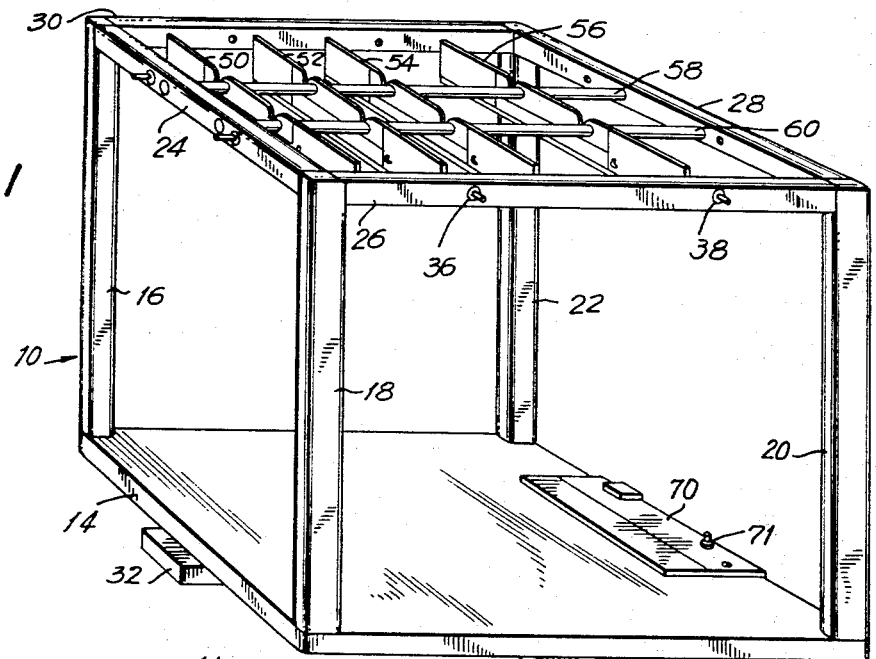
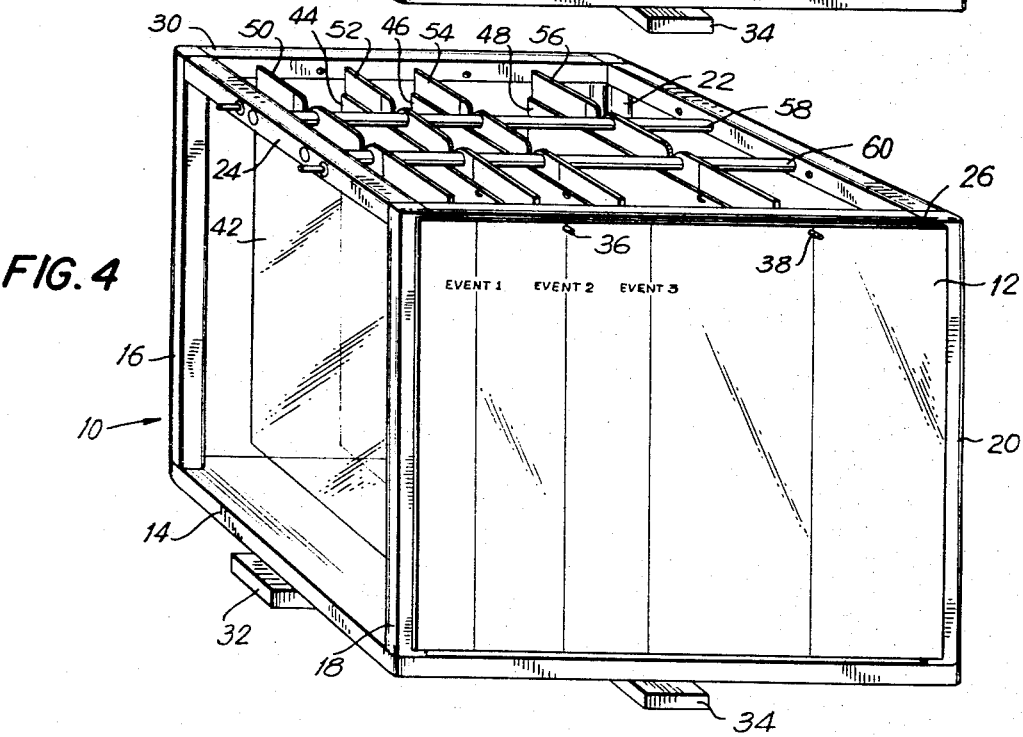
INVENTOR.
PAUL GILMORE WILLIAMS, Jr.
ATTORNEYS

INVENTOR
PAUL GILMORE WILLIAMS, Jr.
BY Curtis Morris & Safford
ATTORNEYS

United States Patent Office 3,418,730
Patented Dec. 31, 1968

3,418,730
PROBLEM-SOLVING EQUIPMENT
Paul Gilmore Williams, Jr., Westport, Conn., assignor to The Williams Inlan Corporation, Westport, Conn., a corporation of Connecticut
Filed Sept. 27, 1966, Ser. No. 582,317
15 Claims. (Cl. 35—24)

ABSTRACT OF THE DISCLOSURE

Problem-solving equipment wherein a transparent chart displaying a plan including a plurality of vertical lines corresponding to major events in a manager's basic plan may be disposed in a first plane and one or more further transparent charts bearing programs comprising both vertical event lines and horizontal activity lines may be arranged in a plurality of parallel planes at an angle to the program chart. In the embodiment of the invention disclosed, an open-sided cube is provided. The transparent plan chart may be hung from two horizontally disposed pins on one side of the cube. A pair of spaced rails are arranged parallel to the plane of the plan chart. The transparent program charts may be hung and moved along the rails whereby they may be aligned with their corresponding plan event lines on the plan chart. A pair of pins may also be disposed in a plane parallel to the planes of the program charts whereby a particular program may be displayed on one side of the cube at right angles to the plan chart.

The transparent programming and planning charts comprise a transparent sheet having a plurality of equally-spaced apertures along the top thereof so that they may be hung from the pairs of pins on the sides of the cube. The charts are provided with a time scale along the bottom thereof, the spacing of the apertures corresponding to a unit increment of time on the time scale. Additionally, a programming board is provided having a pair of pins spaced apart a multiple of the spacing of said apertures on which the charts may be hung. The programming board is also provided with a time scale, the increments of which correspond to the spacing of the apertures so that the charts may be mounted in different positions on the planning board corresponding to different unit increments of advanced or delayed time.

---

The present invention relates to problem-solving equipment by means of which the patterns and inter-relationships of problems become more readily and accurately discernible, thereby enabling a user of the equipment to reach solutions to problems faster and more precisely than with traditional planning and programming methods. Although one of the more apparent applications of the present invention is as a management control and display device for business executives in their integral planning, programming, scheduling and budgeting of projects and will be described in this environment, it will become obvious that this equipment has considerably broader application and may be employed in understanding and solving a wide variety of problems at all levels of corporate and institutional management.

At the present time, various techniques, such as the goal-oriented "Program Evaluation and Review Technique" (PERT), the activity-oriented "Critical Path Method" (CPM), and Gant charting, are being used extensively by industry management in the planning, programming, scheduling and budgeting of projects. These techniques involve the use of graphical presentations of a number of series-related events or goals and the activities which must be performed to achieve these goals. The goals and activities are presented in a diagram, known as a "network," which includes a plurality of circles, known as "nodes," and a plurality of lines interconnecting the nodes. The nodes represent the starts and completions of project phases, while the interconnecting lines represent the activities which must be performed. The nodes may be labeled with the dates as to when the objectives are to be achieved, while the interconnecting lines may be labeled to indicate the nature of the activities and the times required to perform the activities. These graphical presentations have become popular management tools because they provide a clearer and more rapid understanding of a situation than does a linear statement such as a traditional written plan which itself often requires much more time to prepare and to read than is really necessary or desirable.

The goal orientation concept of PERT and the activity orientation concept of CPM recently have been combined in new networking techniques. Of major importance among these newer networking developments was the "explosion of the node" in the Critical Path Method. Instead of circles designating start and completion points in a project phase, the circles are opened into thin vertical lines, as short or as long as needed, to represent the start and completion points. In practice, diagrams drawn in this way can be read at increased speeds.

In spite of such improvements, these networking methods have the major limitation of overtly implying that all activities within the corporation are logically suited for networking or pragramming. Such a result would be totally improper. A manager's activities should not be subjected to networking in a plan susceptible to frequent changes in judgment based decisions.

To this end, the methodology which forms the basis of the present invention distinguishes between activities which should be networked and those which should not. Two types of presentation are provided in a single integral unit. The first, termed a "plan," displays a manager's basic plan and is not a network. Instead, the "plan" includes a plurality of vertical lines corresponding to major events in the manager's basic plan. The second presentation, termed a "program," includes both vertical event lines and horizontal activity lines. One such "program" is provided for each major event in the basic plan. The program displays in a network the events which must be achieved and the activities which must be performed to accomplish successfully the associated major event in the plan.

This separation and the consequent new capability of properly focusing a top-level manager's time and attention first on the plan has the following advantages: he is in a better position to understand the major and basic situation rather than the maze of detail; he has ample opportunity to cope with the many events that cannot be planned for in advance through detailed scheduling; and he is able to determine for which major events in the plan separate programs should be networked and for which major events no programs should be prepared.

It is an object of the present invention to provide new and improved problem-solving equipment.

It is another object of the present invention to provide problem-solving equipment by means of which the patterns of problems become more readily and more precisely discernible, communicable and controllable.

It is yet another object of the present invention to provide problem-solving equipment which permits efficient management, planning, programming scheduling and budgeting of projects.

It is still another object of the present invention to provide problem-solving equipment which is so flexible as to permit its use in a wide variety or applications.

It is still a further object of the present invention to provide new and improved problem-solving equipment which is simple in both construction and utilization, while also being relatively inexpensive to fabricate.

Brieby, these objects are attained according to the present invention by equipment which displays problems and situations by means of diagrams, but in which networking is controlled, that is networking is employed where appropriate and not employed where it would be ill-conceived. In addition, this equipment is arranged to display networks in such a manner that individual programs may be examined separately, two or more programs may be viewed simultaneously and major events and goals are readily and separately discernible. Because of this, it is possible to "see" both major and minor problem patterns quickly so as to permit the development of solutions to these problems in an efficient and worthwhile manner. In accordance with one embodiment of the present invention there is provided equipment which displays in three dimensions diagrams which graphically represent a project and which have been prepared in a selected manner. These diagrams are drawn on "see-through" charts which are transparent sheets of plastic or similar material. One see-through chart is arranged to display a project plan diagram having a plurality of vertical lines representing events in the project plan. These vertical lines are spaced apart by distances representing the time durations between these events of the project plan. A plurality of additional see-through charts, one associated with each of the vertical event lines in the project plan diagram, is arranged to display separate program diagrams, each of which has a plurality of vertical lines representing events in the particular program needed to achieve the event in the project represented by the associated vertical event line in the project plan. Each of the program diagrams also ordinarily has a plurality of horizontal lines representing parallel activities to be carried out in the particular program to achieve the events in the particular program represented by the vertical event lines of the particular program diagram. The see-through charts upon which the program diagrams are presented are movably mounted one behind another and perpendicular to the see-through chart upon which the project plan is presented.

Each of the program see-through charts, thus, may be aligned with its associated vertical event line in the project plan diagram. In a sense, there is an "explosion" of a vertical event line of a traditional two-dimensional network into a two-dimensional program network disposed perpendicular to the plan chart. As a result, by means of a single integral unit the project plan may be viewed separately as may any program diagram, while two or more program diagrams may be viewed simultaneously.

For a better understanding of the present invention, together with other and further objects thereof, reference is made to the following description, taken in connection with the accompanying drawings, and its scope will be delineated in the appended claims.

Referring to the drawings:

FIGURE 1 is a perspective view of the framework of one embodiment of problem-solving equipment constructed in accordance with the present invention;

FIGURE 2 illustrates the format of a see-through chart used in conjunction with the framework shown in FIGURE 1;

FIGURE 3 illustrates a chart anchor which may be employed in mounting the see-through chart of FIGURE 2 in the framework of FIGURE 1;

FIGURE 4 is a perspective view showing the manner in which problem-solving equipment constructed in accordance with the present invention is employed;

FIGURE 5 is a front elevation of the problem-solving equipment of FIGURE 4; and

Figure 6A:
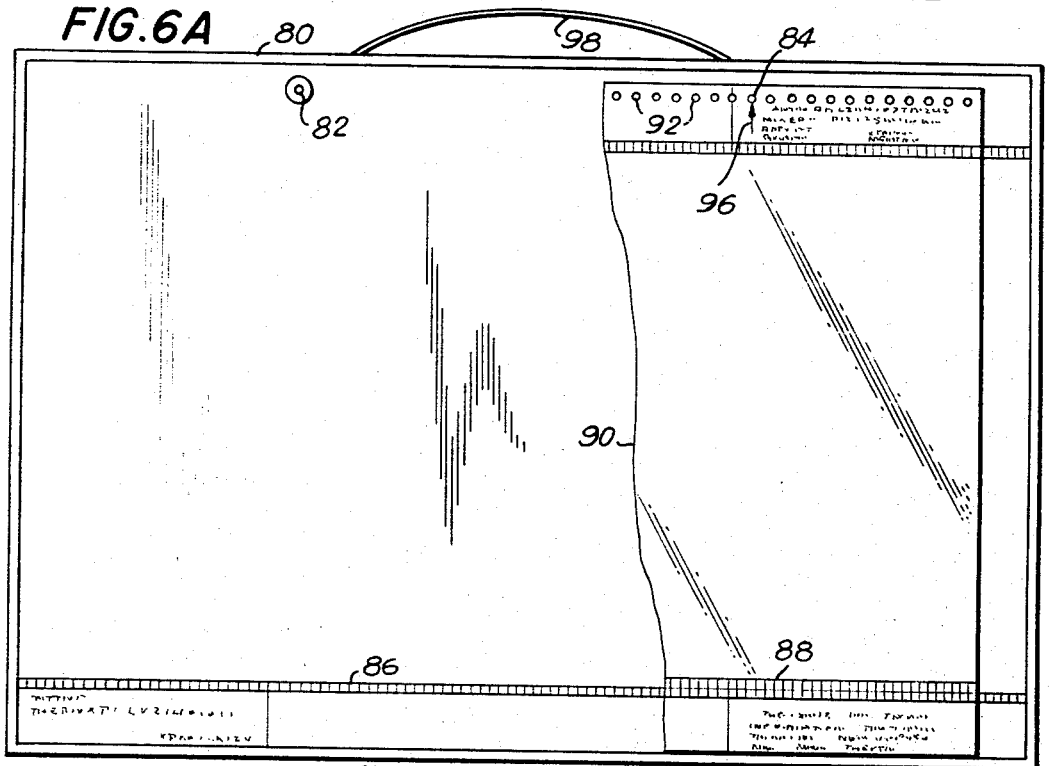
FIGURES 6a and 6b illustrate a planning board which may be used in conjunction with the embodiment of the invention shown in FIGURES 1 and 4.

Referring to FIGURE 1, the framework, designated generally by reference numeral 10, serves to support a plurality of see-through charts, such as the chart 12 shown in FIGURE 2. The see-through charts are made of a plastic material, for example, vinyl acetate, and are partially transparent or fully transparent. The framework 10, in cubic form, includes a buttom surface 14 from which four vertical members 16, 18, 20 and 22 extend upwardly. Four horizontal members 24, 26, 28 and 30 extend between the upper ends of pairs of the vertical members 16, 18, 20 and 22.

The framework 10 is rotatably mounted upon a base composed of a pair of crossed supports 32 and 34. The arrangement is similar to a lazy Susan so the details of the mounting have not been shown.

One see-through chart is mounted on one face of the cubic framework 10 by means of a pair of spaced pins 36 and 38 secured to horizontal member 26. As shown most clearly in FIGURE 2, the see-through chart 12 has a series of apertures 40 along its top edge adapted to receive the two pins 36 and 38. FIGURE 4 shows the manner in which a see-through chart 12 is mounted on one of the faces of the framework 10.

A plurality of additional see-through charts 42, 44, 46 and 48, similar to chart 12, are mounted within the framework 10 perpendicular to chart 12. Charts 42, 44, 46 and 48 are mounted within the framework by means of chart anchors 50, 52, 54 and 56 which individually are movable along a pair of slide rails 58 and 60. Rails 58 and 60 extend across the top of framework 10 between horizontal members 24 and 28 and parallel to the face of the framework upon which see-through chart 12 is mounted.

FIGURE 3 illustrates in detail the structure of the chart anchors. Each anchor has a pair of hook-shaped openings 62 and 64 in its upper edge which are spaced apart by a distance corresponding to the distance between the slide rails 58 and 60. In addition, each hanger is provided with a pair of spaced hooks 66 and 68 by means of which the see-through charts are mounted on the anchors as the hooks are passed through apertures 40. The anchors, in turn, are movably mounted on the slide rails 58 and 60 by means of the hook-shaped openings 62 and 64.

In use, the plan of a project is drawn on see-through chart 12 and the chart then is mounted on pins 36 and 38. Alternatively, this face of the framework 10 may be provided with a transparent panel so that the plan diagram may be drawn directly on the panel or on chart 12 after it has been mounted on pins 36 and 38. The plan diagram has a plurality of vertical lines representing events in the project. The spaces between vertical lines in the plan diagram represent the time durations between events in the project. For example, the project in question may be the marketing of a new product. Event number 1 may be the completion of a market survey, event number 2 the completion of the testing of the product, event number 3 the initiation of advertising and the remaining events other important goals which must be achieved in order to market a product successfully. Each goal in the project plan, in turn, has its own program of activities which must be performed to achieve the goal. These programs are networked individually on the see-through charts 42, 44, 46 and 48. Two typical program networks, one shown in solid lines and the other in broken lines, are illustrated in FIGURE 5. The solid line network corresponds to the one drawn on chart 42, while the broken line network corresponds to the one drawn on chart 44. Similar networks are drawn on the remaining see-through charts 46 and 48 but have been omitted for the sake of clarity. Each of the program networks has a plurality of vertical lines representing events in the program needed to achieve the associated event in the project plan and a plurality of horizontal lines representing activities to be carried out to achieve the events in the program. The lengths of the horizontal activity lines represent the time durations of the activities. The program networks are similar to the networks of PERT and CPM. These networks are prepared on the same time axis, with zero-time at the left and increasing time to the right, so that all the networks may be referenced against the same axis when the charts 42, 44, 46 and 48 are mounted one behind the other within the framework 10. The last vertical event line on each program network corresponds to the conclusion of the program and the achievement of the associated major event in the project plan on see-through chart 12. Thus, line 43 in the solid line network indicates the achievement of event number 1 of the project plan, while line 45 of the broken line network indicates the achievement of event number 2.

After the program diagrams have been drawn on charts 42, 44, 46 and 48, these charts are hooked onto their associated anchors 50, 52, 54 and 56 and the anchors, in turn, are mounted on the slide rails 58 and 60. These anchors are moved along the slide rails 58 and 60 until the charts 42, 44, 46 and 48 are aligned with their associated vertical event lines in the plan diagram. The transparency of chart 12 facilitates this alignment of the charts. This arrangement results in a correspondence in the time axes of the plan diagram on chart 12 and the program networks on charts 42, 44, 46 and 48. Zero-time on the plan diagram is adjacent to vertical member 18, while each major event line in the plan diagram is located to correspond in time to the last event line in the associated program network on charts 42, 44, 46 and 48.

The arrangement of the see-through charts is such that the plan diagram on chart 12 may be viewed separately as may any program network, while two or more program networks may be viewed simultaneously. A user of the equipment who may be interested only in the general overall plan and not in the details of the various program activities finds the plan diagram of particular value since his observations are not encumbered or complicated by diagrams of a maze of parallel activities which represent lower level functions. If this individual wishes to examine a particular program, he may rapidly select the one of interest because of the alignment of the program charts with the event lines of the plan diagram. The turning from a view of the plan diagram to a view of the program diagrams is facilitated by the lazy Susan mounting of the cubic framework.

On the other hand, an individual whose time and effort may be required for two or more of the programs is interested in viewing the program networks of these programs simultaneously so that he may spot any periods during which his time and effort may be required for more than one program at the same time. FIGURE 5 illustrates the view such an individual is provided with when he examines two or more program diagrams simultaneously. A preferred practice is to use differently colored lines for different types of activities or different individuals. If two similarly colored lines are superimposed in time, a conflict of time is indicated.

To aid in viewing the information of the see-through charts and to cast shadows at desired points for presentation purposes, illuminating means 70 are provided on the bottom surface 14 of the framework 10. The illuminating means 70 may include a conventional light source secured to the framework 10 by suitable means which is turned on and off by a switch 71.

Figure 6B:
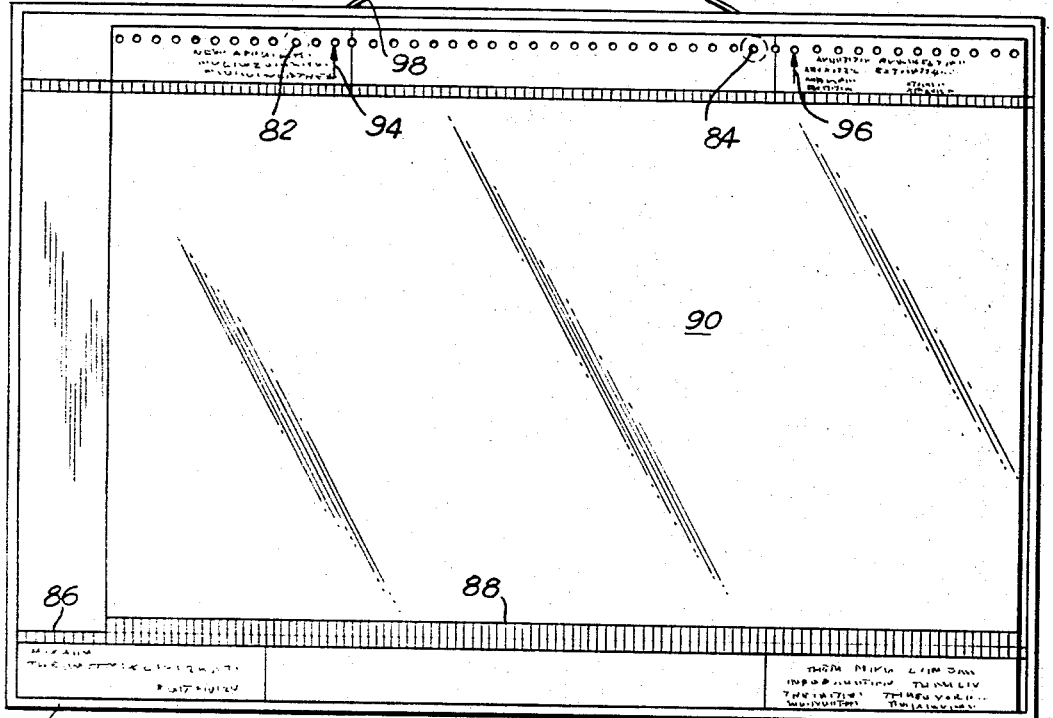

FIGURES 6a and 6b illustrate a two-dimensional planning board 80 which may be used in conjunction with the problem solving equipment shown in FIGURES 1 and 4. As will become readily apparent, the planning board 80 of FIGURES 6a and 6b may be an integral component of the equipment of FIGURES 1 and 4 or it may be constructed separately.

The planning board 80 is provided with a pair of pins 82 and 84 near its upper edge. A see-through chart 90, similar to the charts in FIGURES 2, 4 and 5, is mounted on the planning board 80 by means of the pins 82 and 84. The chart 90 has a series of apertures 92 along its upper edge adapted to receive the two pins 82 and 84. Two of these apertures, spaced inward equally from the left-hand and right-hand edges, are identified by the arrows 94 and 96 as the neutral apertures. When the chart 90 is mounted on the planning board 80 with the neutral apertures 94 and 96 receiving the pins 82 and 84, respectively, the chart is positioned in the center of the planning board, equally spaced from the left-hand and right-hand edges of the planning board. The planning board 80 also is provided with a time reference scale 86 near its lower edge beneath a similar scale 88 near the lower edge of chart 90. The time reference scale 86 may correspond to days, weeks or other time units depending upon the particular plan diagrammed on chart 90.

The planning board 80 serves to provide a real-time indication of the status or progress of a plan diagrammed on the see-through chart 90. At the time the plan is commenced, the see-through chart 90 is mounted on the planning board with the pins 82 and 84 being passed through the neutral apertures 94 and 96, respectively, so that the start of the plan is aligned with zero-time on the time reference scale 88. The timing of the various events in the plan diagram on the chart 90 is indicated by the time reference scale 86. As is often the case, circumstances arise which cause either a speed-up or delay in carrying out a particular plan. In order to provide an indication of the actual status or progress of a plan, the see-through chart 90 is moved to the left or to the right, depending upon whether there is a speed-up or delay. The amount of movement in either direction is set by referring to the reference time scale 86 through see-through chart 90. For example, if each unit on the reference time scale 86 corresponds to one week and two week delay is anticipated, the chart 90 is moved to the right two units. This causes the terminal event line as well as other event lines in the plan diagram to become aligned with dates on the reference time scale 86 two weeks later than originally indicated which corresponds to the actual conditions. If there are further delays, the chart 90 is moved further to the right, while if unexpected speed-ups occur the chart is moved to the left.

The planning board 80 may be an integral component of the problem-solving equipment of FIGURES 1 through 4, inclusive, and serve as the face of the framework 10 upon which the plan diagram see-through chart 12 is mounted. In this case, in order to permit viewing of the program charts 42, 44, 46 and 48 through the planning board 80, the planning board would be a transparent panel. On the other hand, the planning board 80 may be a separate component used in conjunction with the equipment of FIGURES 1 and 4. In this case, the planning board is provided with a handle 98 to facilitate its movement from one location to another.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:
1. Problem-solving equipment comprising:
 a first transparent sheet upon which may be drawn a project plan diagram having a plurality of vertical lines representing events in a project and spaced apart by distances representing the time durations between said events in said project;
 a plurality of additional transparent sheets, one associated with each of said vertical event lines in said project plan diagram, upon which may be drawn separate program network diagrams, each of said program network diagrams having a plurality of vertical lines representing events in the particular program needed to achieve the event in said project rep- resented by the associated vertical event line in said project plan diagram and a plurality of horizontal lines representing activities to be carried out in the particular program to achieve said events in the particular program represented by said plurality of vertical event lines of said program diagrams, the lengths of said horizontal activity lines representing the time durations of said activities;

and means for mounting said plurality of additional transparent sheets one behind another and perpendicular to said first transparent sheet with each of said additional transparent sheets aligned with its associated vertical event line in said project plan diagram, whereby said project plan diagram may be viewed separately, said program network diagrams may be viewed separately and two or more program network diagrams may be viewed simultaneously.

2. Problem-solving equipment according to claim 1 wherein said mounting means include a cubic framework on one face of which said first transparent sheet is mounted.

3. Problem-solving equipment according to claim 2 wherein said mounting means further include a pair of slide rails extending across the top surface of said cubic framework parallel to said one face and upon which said plurality of additional transparent sheets are movably mounted.

4. Problem-solving equipment according to claim 3 wherein said mounting means further include a base upon which said cubic framework is rotatably mounted.

5. Problem-solving equipment accordnig to claim 2 wherein said mounting means further include a pair of spaced pins on said one face and said first transparent sheet has a series of apertures adapted to receive said pair of spaced pins.

6. Problem-solving equipment according to claim 2 wherein said mounting means further include a transparent panel forming said one face.

7. Problem-solving equipment comprising:

a three-dimensional framework having means for mounting a first transparent sheet upon which may be drawn a project plan diagram having a plurality of vertical lines representing events in a project and spaced apart by distances representing the time durations between said events in said project and further having means for mounting a plurality of additional transparent sheets, one associated with each of said vertical lines in said project plan diagram, one behind another with each of said additional transparent sheets aligned with its associated vertical event line in said project plan diagram, each of said additional transparent sheets having a separate program network diagram having a plurality of vertical lines representing events in the particular program needed to achieve the event in said project represented by the associated vertical event line in said project plan diagram and a plurality of horizontal lines representing activities to be carried out in the particular program to achieve said events in the particular program represented by said plurality of vertical event lines of said program diagrams, the lengths of said horizontal activity lines representing the time durations of said activities.

8. Problem-solving equipment according to claim 7 wherein said three-dimensional framework is cubic.

9. Problem-solving equipment according to claim 8 wherein said means for mounting said first transparent sheet include a pair of spaced pins on one face of said cubic framework.

10. Problem-solving equipment according to claim 9 wherein said means for mounting said additional transparent sheets include a pair of slide rails extending across the top surface of said cubic framework parallel to said one face.

11. Problem-solving equipment according to claim 7 wherein said three-dimensional framework is cubic and has a transparent panel forming one face.

12. A "see-through" chart for problem-solving equipment comprising:

a transparent sheet upon which may be drawn information relating to a project having a series of equally-spaced apertures along one edge adapted to receive two spaced pins, the spacing of said apertures being a factor of the spacing of said pins, whereby said sheet may be hung vertically from said pins, and shifted in increments representing the spacing of said apertures, and a time reference scale disposed along a horizontal line on said transparent sheet, a unit increment of time on said scale also being a factor of the spacing of said pins.

13. A planning board for solving problems in combination with the "see-through" chart defined in claim 12, said planning board comprising:

a planar surface;

a time reference scale disposed along a horizontal line on said planar surface including a zero time position;

and means for movably hanging said chart in a vertical position so that said chart may be moved along said time reference scale, on said planar surface, said means including a pair of spaced pins adapted to pass through pairs of said apertures in said chart.

14. A planning board and "see-through" chart according to claim 13 wherein said planar surface is rectangular and said spaced pins are located at one horizontal edge of said planar surface and said time reference scale is disposed along the other horizontal edge of said planar surface.

15. A planning board and "see-through" chart according to claim 13 wherein:

two of said apertures have identifying indicia and are equally spaced from the ends of said chart; and said pins are spaced in correspondence with the spacing of said two apertures from each other, whereby when said two apertures are engaged by said pins, a plan or program diagram on said chart may be aligned with said zero time position on said time reference scale on said planar surface.

References Cited

UNITED STATES PATENTS

| | | | |
|---|---|---|---|
| 2,608,012 | 8/1952 | Jackson | 40—19.5 X |
| 3,124,885 | 3/1964 | Mendell | 35—24 |
| 3,290,797 | 12/1966 | Opel | 35—24 |
| 3,299,550 | 1/1967 | Miyamoto | 40—19.5 |

FOREIGN PATENTS 176,384  10/1953  Austria.

EUGENE R. CAPOZIO, *Primary Examiner.*

W. GRIEB, *Assistant Examiner.*

U.S. Cl. X.R.

116—136